UNITED STATES PATENT OFFICE.

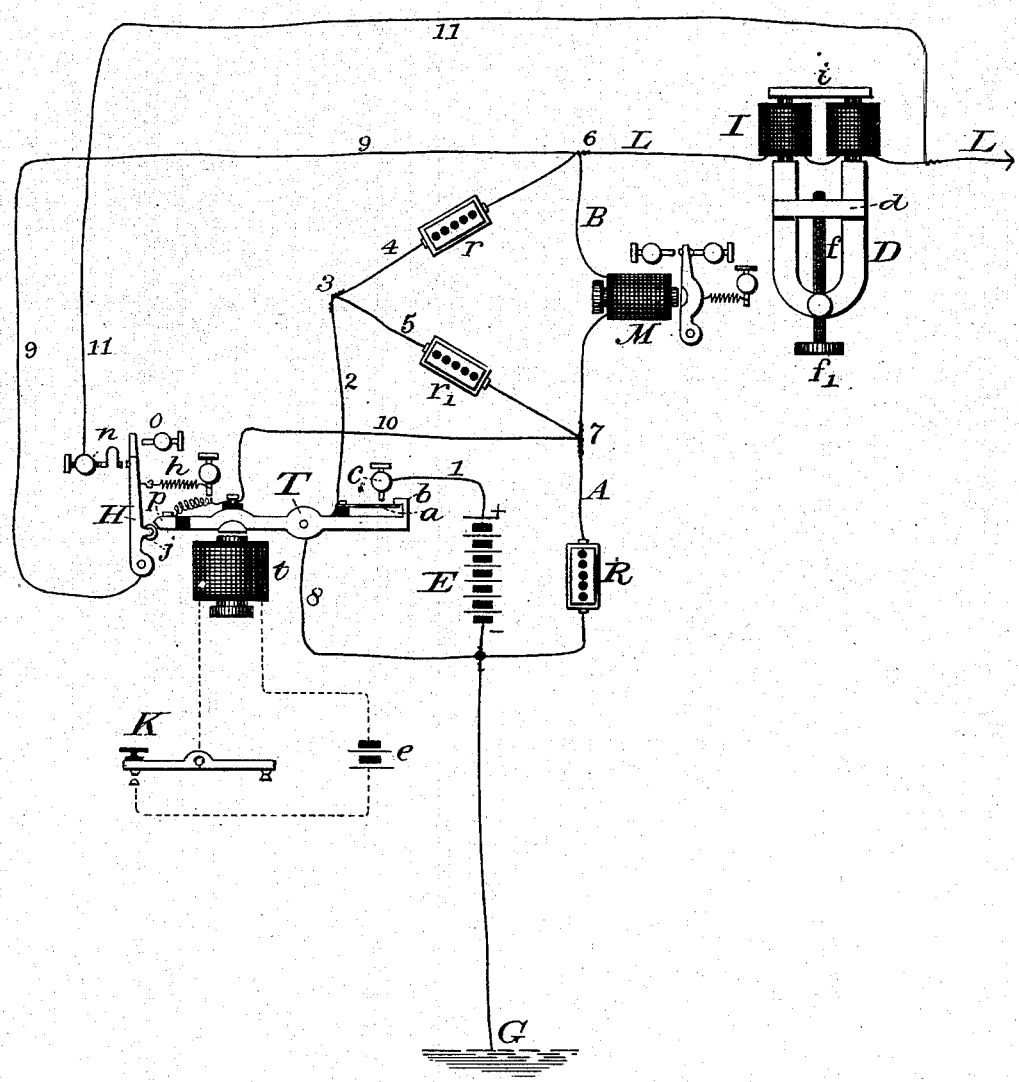

STEPHEN D. FIELD, OF NEW YORK, N. Y.

DUPLEX TELEGRAPH.

SPECIFICATION forming part of Letters Patent No. 261,916, dated August 1, 1882.

Application filed November 16, 1881. (No model.)

*To all whom it may concern:*

Be it known that I, STEPHEN D. FIELD, a citizen of the United States, residing at New York, in the county and State of New York, have invented certain new and useful Improvements in Duplex Telegraphs, of which the following is a specification.

In transmitting two sets of signals simultaneously in opposite directions over one and the same telegraph-line much interference and confusion arise from the false signals which are produced upon the receiving-instruments by currents of charge and discharge, which are due to the electro-static or inductive capacity of the line. The phenomenon manifests itself more especially when the line is of considerable length and well insulated. The conditions under which this effect occurs are as follows: If an insulated telegraph-line of considerable length, having its remote end connected with the earth, is suddenly placed in connection with one pole of a battery whose opposite pole is likewise connected with the earth, a powerful current of electricity of momentary duration flows into the conductor, which is termed the "current of charge." As soon as the conductor has received its maximum charge a continuous and uniform current is established, which flows from the battery through the whole length of the conductor and returns through the earth from the distant station. The longer the line and the greater its resistance the greater is the strength of the current of charge in proportion to that of the permanent current which traverses the line after it has received its charge. If, after the current has thus been established, the line is disconnected from the battery at the home station and instantly connected with the earth, another but less powerful momentary current flows from the conductor back to the earth at the home station, which is termed the "current of discharge."

The essential condition required for the simultaneous transmission of telegraphic signals in opposite directions upon the same conductor is that the signals transmitted by the key at either terminal station shall not produce any effect whatever upon the associate receiving-instrument at the same station.

In order to prevent the receiving-instrument at the home station from being actuated by the outgoing currents transmitted from the home battery, and which are designed to produce signals at the distant station, it is usual to employ a device termed an "artificial line," which consists of a branch or derived circuit diverging from the main line at a point near its junction with the transmitting-key, and proceeding directly to the earth, or, what is in effect the same thing, returning to the other pole of the battery. This derived circuit is provided with one or more adjustable artificial resistances, collectively termed a "rheostat," by means of which its total resistance may be so regulated as to bear a definite proportion to that of the main line. The home receiving-instrument may be rendered neutral to outgoing currents by well-known methods, one of which consists in placing it in the circuit of a "bridge-wire," which is a branch or cross circuit connecting the main and artificial lines at points of equal potential with reference to such circuits. It has, however, been found by experience that while the resistance of the main and artificial lines may be the same, or may be in proper proportion to each other, their inductive or electro-static capacity may be very different, the main line having great inductive capacity, while the artificial line has little or none. Hence when a signal is transmitted by connecting the battery to the line a current of charge will flow into the latter, and, as this is not compensated by a similar current of charge flowing into the artificial line, a false signal is produced upon the receiving-instrument. So, also, when the battery is disconnected and the line put to earth at the home station, the discharge which takes place in part traverses the bridge-wire and receiving-instrument, and another false signal is produced.

The object of my invention is to prevent this action of the charge and discharge currents upon the receiving-instrument. To this end I make use of an electro-magnetic inductor or accumulator, which is placed at the home station at a point between the duplex apparatus and the line, and which is kept constantly polarized by means of an artificial permanent magnet, the latter being preferably provided with an adjustable armature, so that its inductive effect upon the soft-iron cores may be regulated. I also provide a normally-open shunt-circuit passing around the said electro-magnetic inductor, together with a device which establishes a temporary connection between the terminals of the electro-magnet of the receiving-instrument and simultaneously closes the said shunt at the instant a connection is formed between the line and either the battery or the earth at the home station.

The subject-matter claimed as new will be more particularly set forth in the claims at the end of this specification.

The accompanying drawing is a diagram representing the apparatus and electrical connections at one terminal station of a duplex telegraph to which my invention has been applied.

Referring to the diagram, E represents the main battery, the negative pole of which is connected directly to the earth at G in the usual manner.

T represents the lever of the transmitter, which is preferably actuated by an electro-magnet, $t$, placed in the circuit of the local battery $e$, (represented by a dotted line,) which is opened and closed by the manipulation of the key K. Upon the transmitter-lever T is mounted an insulated contact-spring, $a$. This normally rests against a contact-stop, $b$, formed upon the end of the lever T, which is therefore termed the "resting-stop." Just above the contact-spring $a$ is placed a fixed stop, $c$, in such a relative position thereto that when the transmitter-lever T is actuated by depressing the key K the contact-spring $a$ is brought against the stop $c$, which is termed the "working contact," and at the same instant the contact between the said spring and the stop $b$ is interrupted. The positive pole of the main battery E is connected by a conductor, 1, to the stop $c$. The lever T of the transmitter is connected directly with the earth by a conductor, 8. A conductor, 2, is attached to the insulated contact-spring $a$, and divides at the point 3 into two branches, 4 and 5. The branch 4 extends to the point 6, where it joins the main line L, extending to the distant station. The other branch, 5, extends to the point 7, where it joins the artificial line A, which returns directly to the earth at G. Between the point 6 on the main line and the point 7 on the artificial line a bridge-wire, B, extends, in which is included the electro-magnet M of the home receiving-instrument. Rheostats or adjustable resistances $r$ $r'$ are inserted in the wires 4 and 5, respectively, and another rheostat, R, is placed in the circuit of the artificial line A. In accordance with the well-known laws of electrical conduction, it will be evident that if the amount of resistance in the rheostat R is made exactly equal to that of the line-wire L, leading to the distant station, and the resistances $r$ and $r'$ are made equal to each other, no current will pass through the bridge-wire between the points 6 and 7. Moreover, the result will be the same in any case in which the proportion of the rheostat $r$ to the line L is the same as that of the rheostat $r'$ to the artificial line A, inclusive of the rheostat R. The rheostat R is preferably made adjustable, in order to compensate for the varying resistance of the main line under different conditions of insulation.

The organization which I have thus far described is well known and in common use, and in itself forms no part of my invention. Its practical operation is as follows: In transmitting a signal from the home station the key K is depressed by the operator, which causes the electro-magnet $t$ to attract its armature, and thereby raise the opposite extremity of the transmitter T. This brings the insulated spring $a$ into contact with the stop $c$, and thereby forms a connection between the battery E and both the main and artificial lines L and A. In consequence of the inductive capacity of the line L a current of charge traverses the wire 4 at the instant the battery is connected therewith, which current is not compensated by any corresponding current of charge in the wire 5. Hence a difference of potential is caused between the points 6 and 7 and a false signal is produced upon the receiving-instrument. So, also, when the key K is released and the contact-spring $a$ is detached from the battery-contact $c$ and connected with the earth-contact $b$ a current of discharge takes place through the wire 4, which in like manner is not compensated by any corresponding current in the wire 5, and thus another false signal is produced.

Among other devices which have been employed for the purpose of counteracting the false signals thus arising from the effects of electro-static induction is that known from the name of its inventor as the "Varley coil," which consists of one or more cores or masses of soft iron surrounded by coils of wire in the manner of an ordinary electro-magnet, and placed in the main circuit at a point between the duplex apparatus and the line, as shown at I in the drawing. The mass of soft iron within the coil becomes magnetized in the ordinary well-known manner upon the passage of a current to the line; but the moment this current ceases or is interrupted the disappearance of its magnetism produces a powerful magneto-electric current in the surrounding coil, which has the same polarity or direction as the original exciting current, and which traverses or tends to traverse the line in the same direction. Consequently when such a device is placed in the circuit of the line L, as hereinbefore stated, it will be apparent that the electro-static discharge, in attempting to pass from the line through the receiving-instrument M to the earth at the termination of a transmitted signal, will be met by a discharge of opposite or reverse polarity proceeding from the magnetic inductor, which will tend to neutralize or destroy it, and which will effectually do so, provided it is of equal strength and also of equal duration. It will be understood, therefore, that in order to effectually neutralize the electro-static discharge it is only necessary that the opposing discharge from the inductor should occur at precisely the same time and be of equal strength and duration.

The principal practical objection to the use of the Varley coil as hitherto constructed arises from the well-known circumstance that an electro-magnet when demagnetized induces a magneto-electric current of much greater effective strength than it does when magnetized. On the other hand the electro-static discharge from a telegraph-line is invariably less than the charge, owing to the leakage which takes place through imperfect insulation during the time which elapses during the charge and discharge. Hence the principal electro-static disturbance occurs at the moment of charging the line, which is precisely the time when the inductor produces its minimum effect, and on the other hand the discharge or minimum electro-static disturbance takes place at the moment of the maximum effect produced by the inductor.

In my present invention I have overcome this objection by making use of one or more permanently-polarized electro-magnetic inductors. This polarization I effect in the manner illustrated in the drawing—that is, by means of an artificial permanent magnet, D, the poles of which are placed in magnetic contact with the soft-iron cores of the inductor. The current of the line is made to traverse the coils of the inductor in such a direction that it tends to demagnetize the cores at the moment the charge passes to the line, while, conversely, the magnetization is effected at the moment of discharge. In order to regulate the normal degree of polarization in the cores of the inductor to suit the different strengths of current arising from varying atmospheric conditions, I provide a soft-iron armature, d, which, by means of an adjustable screw, f, provided with a milled head, f', may be moved more or less away from the poles of the permanent magnet, and thereby regulate in a well-known manner its inductive effect upon the soft-iron cores. I prefer to unite the poles of the inductor I by means of a soft-iron yoke, i, as its inductive effect is thereby augmented in a well-known manner.

It is obvious that any required number of inductive-cores may be arranged in this manner, which may differ in respect to their lengths and diameters, thus forming a compound inductor, whereby the duration as well as the strength of the charge and discharge may be varied to suit circumstances. I also prefer to employ, in connection with the inductor, when constructed in the manner hereinbefore set forth, a device similar to that shown and described in my former patent, No. 244,218, of July 12, 1881, by which the terminals of the receiving-magnet are momentarily connected together, so as to shunt it out of circuit at the instant of change of potential in the bridge-wire. This is effected by mechanism which I will now proceed to describe.

Upon the lever of the transmitter T is mounted a V-shaped metallic projection, p, which is insulated from the lever. This projection, when actuated by the movement of the transmitter-lever, is brought into contact with a small metallic roller, j, which is mounted upon a pivoted lever, H. The lever H is provided with a contact-point at a point beyond the inductor I. By an inspection of the diagram it will be understood that when a connection is formed between the projection p and the lever H the wires 9 and 10 are united, thus shunting or cutting out the receiving-instrument M, and that when the lever H is brought into contact with the yielding stop n, by a similar operation the wires 9 and 11 are connected, and the inductor I is in like manner shunted or cut out.

The practical operation of the hereinbefore-described organization is as follows: When the key K is depressed and the battery E connected to the line by means of the transmitter-lever T and its circuit-connections, the V-shaped projection p comes in contact with the roller j and forces the lever H into contact with the yielding stop n. The contact between p and j closes the shunt 9 10, connecting the terminals of the coils of the receiving-magnet M, and immediately thereafter a contact is formed between the lever H and the spring n, in like manner cutting out the inductor I by means of the wires 9 11. The result of this operation is that when the key is closed the current of charge passes directly by the wires 2, 3, and 4, and thence by wires 9 and 11, to the line L, and can produce no effect upon the receiving-instrument M, as the latter is that moment cut out by the shunt-circuit. The inductor I is, however, permitted to come into action by the breaking of its shunt immediately after the shunt is removed from the receiving-magnet M. So, also, when the key is closed the same result is produced, the inductor-shunt being closed after that of the receiving-instrument. By this device I neutralize and prevent the prolongation of the signals which occurs in working lines of very great lengths. The duration of the time during which the terminals of the receiving-magnet M are united by the shunt-circuit is capable of being adjusted by means of the screw-stop o, and a similar regulation of the time of closing of the shunt passing around the inductor I may be effected by means of the adjustable yielding stop n.

It is obvious that the distribution of the continuous current, as distinguished from the current of charge and discharge, between the main and artificial lines will take place in this apparatus precisely as in the duplex apparatus ordinarily used.

I remark that, although I have found the mechanism herein described well adapted to produce the result set forth, I do not desire to confine myself rigidly thereto, as many combinations of apparatus might be devised by means of which the receiving-magnet may be temporarily shunted at the instant of charge and discharge, and the inductor also shunted at the same time or immediately afterward, and these modifications may obviously be made without departing in the least from the general principle of the invention. I also remark that it may be sufficient in some instances to merely shunt the receiving-magnet or the inductor separately, or to make use of the normally-polarized inductor without the shunting device; but I have found in practice that by far the best results, especially when the lines are of great length, are obtained by the action of all these devices in concert, substantially in the manner which has been hereinbefore described.

I claim as my invention—

1. The combination, substantially as hereinbefore set forth, of a duplex-telegraph apparatus, a main line, one or more cores of soft iron, one or more permanent magnets for maintaining said cores in a normally-polarized condition, and one or more coils or helices enveloping said cores and included in the main circuit at a point between the main line and the receiving-instrument of the duplex apparatus.

2. The combination, substantially as hereinbefore set forth, of a duplex-telegraph apparatus, a main line, an electro-magnetic inductor included in the main circuit at a point between the main line and the receiving-instrument, a permanent magnet for maintaining the core or cores of said inductor in a normally-polarized condition, and means for adjusting or regulating the action of said permanent magnet upon said cores.

3. The combination, substantially as hereinbefore set forth, of a main line, an artificial line, a battery, a key or transmitter which connects or disconnects said battery to and from said main and artificial lines simultaneously, a receiving-instrument which is rendered neutral to outgoing currents by the equal and opposite action thereupon of the main and artificial lines, an electro-magnetic inductor in the main line, a normally-open shunt around said inductor, and a device actuated by the transmitter, whereby said shunt is temporarily closed at the time the connection between the battery and the main and artificial lines is either broken or closed.

4. The combination, substantially as hereinbefore set forth, of a main line, an artificial line, a battery, a key or transmitter which connects and disconnects said battery to and from said main and artificial lines simultaneously, a receiving-instrument which is rendered neutral to outgoing currents by the equal and opposite action thereupon of the main and artificial lines, an electro-magnetic inductor in the circuit of the main line, a normally-open shunt-circuit which, when closed, unites the terminals of the electro-magnet of the receiving-instrument, a normally-open shunt-circuit around said inductor, and a circuit-closer actuated by said key or transmitter, whereby both said shunts are temporarily closed at the time the connection between the battery and the main and artificial lines is either broken or closed.

In testimony whereof I have hereunto subscribed my name this 26th day of October, A. D. 1881.

STEPHEN DUDLEY FIELD.

Witnesses:
CHARLES A. TERRY,
MILLER C. EARL.